(12) United States Patent
Forno et al.

(10) Patent No.: US 11,174,733 B2
(45) Date of Patent: Nov. 16, 2021

(54) METHOD FOR REPAIRING A ROTOR OF A MULTI-STAGE AXIAL COMPRESSOR OF A GAS TURBINE

(71) Applicant: ETHOSENERGY ITALIA S.P.A., Turin (IT)

(72) Inventors: Luca Forno, Gassino Torinese (IT); Massimo Valsania, Settimo Torinese (IT)

(73) Assignee: ETHOSENERGY ITALIA S.P.A.

( * ) Notice: Subject to any disclaimer, the term of this patent is extended or adjusted under 35 U.S.C. 154(b) by 266 days.

(21) Appl. No.: 16/562,058

(22) Filed: Sep. 5, 2019

(65) Prior Publication Data
US 2020/0080422 A1 Mar. 12, 2020

(30) Foreign Application Priority Data
Sep. 6, 2018 (IT) .................. 102018000008387

(51) Int. Cl.
*F01D 5/00* (2006.01)
*B23P 6/00* (2006.01)
*F01D 5/06* (2006.01)

(52) U.S. Cl.
CPC .............. *F01D 5/005* (2013.01); *B23P 6/005* (2013.01); *F01D 5/066* (2013.01); *F05D 2230/80* (2013.01)

(58) Field of Classification Search
CPC .......... F01D 5/005; F01D 5/066; F01D 5/022; F01D 5/025; F05D 2230/80; F05D 2260/31; F05D 2240/60; F16C 2360/44; F16C 2360/23; F16C 3/023; F04D 29/321; F04D 29/054; F04D 29/324; F04D 29/322; F04D 29/644; F04D 19/02; B23P 15/006; B23P 6/002
See application file for complete search history.

(56) References Cited

U.S. PATENT DOCUMENTS 5,746,579 A 5/1998 Amos et al.

FOREIGN PATENT DOCUMENTS

| | | |
|---|---|---|
| GB | 2099548 | 12/1982 |
| GB | 2268100 | 1/1994 |
| JP | 593101 | 1/1984 |
| JP | 5970807 | 4/1984 |

OTHER PUBLICATIONS

Italian Search Report for IT201800008387, dated May 9, 2019, 8 pages.

*Primary Examiner* — Moshe Wilensky
(74) *Attorney, Agent, or Firm* — McAndrews, Held & Malloy, Ltd.

(57) ABSTRACT

The method comprises the steps of: a) cutting the shaft of the rotor at a section plane perpendicular to the axis of rotation of the shaft so as to separate the end portion of the shaft on which the bladed discs to be replaced are mounted from the remaining portion of the shaft; b) providing, for each bladed disc to be replaced, a corresponding new bladed disc with a respective hub having a solid cross-section; c) providing a new end portion of the shaft with a solid cross-section; and d) clamping the new bladed discs between the remaining portion of the shaft and the new end portion of the shaft, securing them to the remaining portion of the shaft by anchor bolts.

4 Claims, 2 Drawing Sheets

METHOD FOR REPAIRING A ROTOR OF A MULTI-STAGE AXIAL COMPRESSOR OF A GAS TURBINE

This application claims priority under 35 U.S.C. 119 to Italian Patent Application No. 102018000008387, filed on Sep. 6, 2018, the entirety of which is incorporated by reference herein.

FIELD OF THE INVENTION

The present invention relates in general to a method for repairing a rotor of a multi-stage axial compressor of a gas turbine.

More specifically, the present invention relates to a method for replacing damaged bladed discs of the last stages of a rotor of a multi-stage axial compressor of a gas turbine.

BACKGROUND

As is well known, the rotor of a multi-stage axial compressor of a gas turbine comprises a shaft on which a plurality of bladed discs are mounted, each of the bladed discs forming a respective stage of the compressor. The bladed discs are, for example, heat-shrunk on the shaft so that they are coupled thereto by interference fit.

In this case, in order to ensure a secure coupling between the bladed disc and the shaft, especially in the last stages of the compressor where the operating temperatures can reach very high values, a high interference between the bladed disc and the shaft must be provided. Before the end of the service life of the rotor, it is common practice, in order to increase the service life of the compressor itself, to replace the last bladed discs of the rotor (for example, 1 to 7 discs in an 18-disc compressor rotor), which, due to the high operating temperatures, are the discs most subject to degradation and breakage.

The high interference between the bladed discs and the shaft does not allow, however, for the discs to be removed from the shaft by simply heating the discs so as to increase the internal diameter thereof and thus reduce to zero the interference with the shaft, since the heat required to heat the discs would irreparably damage not only the discs but also the shaft itself, thus making it no longer usable. Accordingly, in order to replace the last bladed discs it is necessary to remove the material of the shaft at the last bladed discs, which of course makes the shaft not usable any more. The rotor of a compressor of a gas turbine is therefore currently repaired by removing the material of the shaft so as to allow all the bladed discs to be removed from the shaft, then building a new shaft and finally fitting on the new shaft the still usable old bladed discs and the new bladed discs in place of the old damaged ones. This process is clearly very burdensome.

SUMMARY OF THE INVENTION

It is therefore an object of the present invention to provide a method for repairing a rotor of a compressor of a gas turbine of the type identified above, by replacing the damaged bladed discs of the last stages with new discs, which is less burdensome than the prior art discussed above.

This and other objects are fully achieved according to the present invention by a method comprising in sequence the following steps:

cutting the rotor shaft at a section plane perpendicular to the axis of rotation of the shaft so as to separate the end portion of the shaft on which the discs to be replaced are fitted from the portion of the shaft on which the still usable discs are fitted;

providing, for each disc to be replaced, a new disc having a hub with a solid cross-section;

providing a new end portion of the shaft with a solid cross-section; and clamping the new discs between the remaining portion of the shaft and the new end portion of the shaft, securing the new discs to the remaining portion of the shaft by anchor bolts.

By virtue of this method, both the time and costs for repairing the rotor of the compressor are reduced, since it is no longer necessary to completely remove the old shaft and build a new one, and it is no longer necessary to mount the old discs on the new shaft either, as it is the case with the currently used method discussed above.

In addition, since the new discs are no longer mounted on the shaft by heat-shrinkage, it is no longer necessary to make said discs of creep-resistant material, such as stainless steel, to avoid the loss of interference with the shaft due to the high operating temperatures. The stainless steel discs commonly used in the compressors of gas turbines have the disadvantage of being very expensive and subject to hydrogen embrittlement. With the method of the present invention the new discs may be made, for example, of micro-alloyed steel, which is less expensive than stainless steel and is not subject to hydrogen embrittlement.

A further advantage of the present invention is that a possible further replacement of the last discs of the rotor of the compressor is particularly easy, since in order to disassemble said discs it is sufficient to remove the anchor bolts by means of which they have been fixed to the old portion of the shaft recovered during the previous intervention of replacement of the last discs.

BRIEF DESCRIPTION OF THE DRAWINGS

Further features and advantages of the present invention will become more apparent from the following detailed description, given purely by way of non-limiting example with reference to the accompanying drawings, wherein.

DETAILED DESCRIPTION OF THE INVENTION

Figure 1:
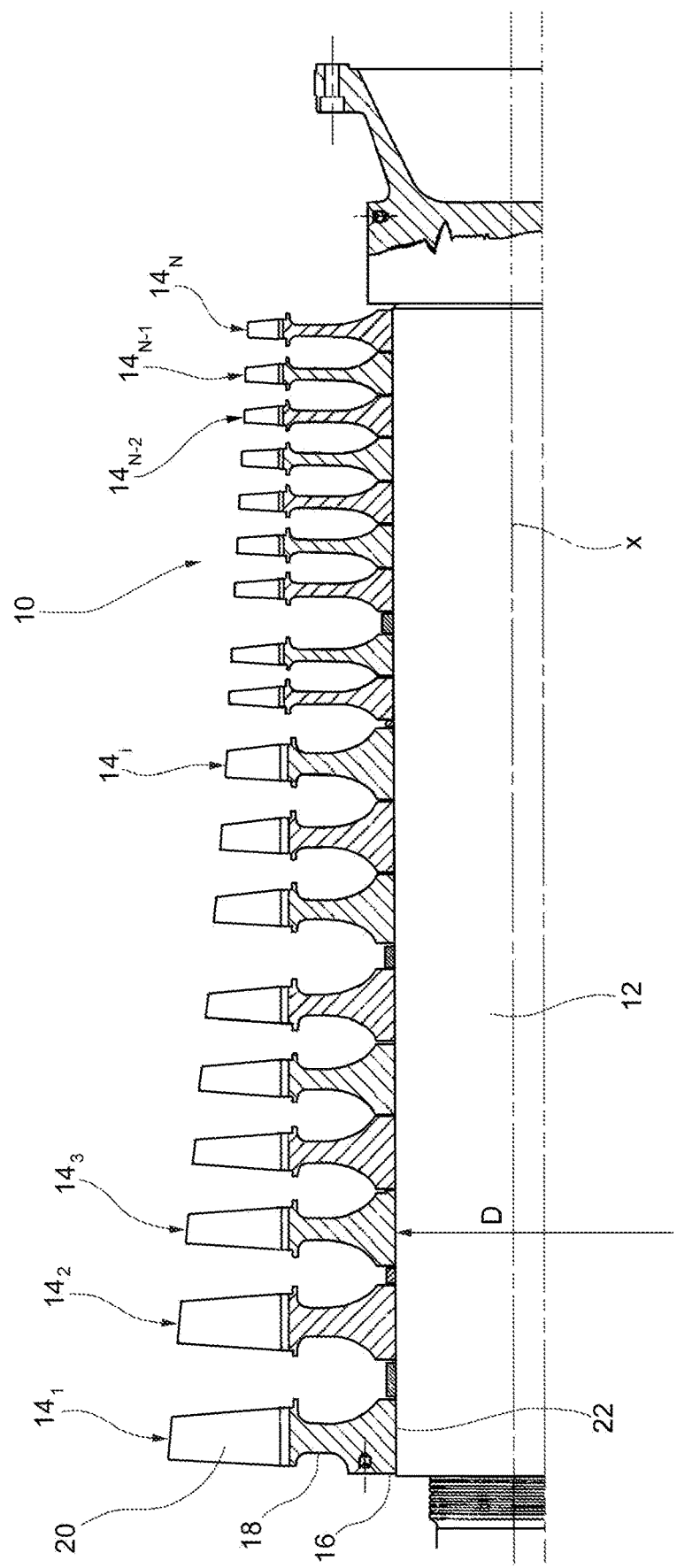
FIG. 1 is an axial section view of a rotor of a compressor of a gas turbine before being repaired with the method of the present invention.

With reference first to FIG. 1, a rotor of a multi-stage axial compressor for a gas turbine to which the method of the present invention is applicable is generally indicated at 10. The rotor 10 basically comprises a shaft 12 (the axis of rotation of which is indicated at x) and a plurality of bladed discs 14 (hereinafter referred to simply as "discs") mounted side by side one after the other on the shaft 12. Each of the discs 14 is identified with an index i from 1 to N according to its position along the rotor. The first disc is thus indicated at $14_1$, while the last disc is indicated at $14_N$. In the example illustrated herein, the rotor 10 is part of an 18-stage compressor and thus the number N of discs 14 is equal to 18, but the invention is obviously applicable to the repair of a rotor of a multi-stage axial compressor having any number of discs.

Each of the discs 14 comprises, as is well known, a hub 16, a crown ring 18 arranged around the hub 16, and a plurality of blades 20 (only one of which, for each disc, is shown in FIG. 1) that extend radially from the crown ring 18. The hub 16 and the crown ring 18 are typically made in one piece, while the blades 20 are made as separate pieces from the crown ring 18 and are rigidly connected thereto, for example by dovetail connection. However, the particular structure of the discs shown herein is not essential for the purposes of the present invention. The hub 16 has a central bore 22 with a diameter corresponding to the diameter D of the shaft 12. Each disc 14 is mounted with interference fit on the shaft 12, for example by heat-shrinking process, so as to be firmly connected to the shaft. The last discs, for example the discs $14_{N-6}$ to $14_N$, which are subject to higher temperatures during operation than the first discs, are typically mounted on the shaft 12 with greater interference than that with which the first discs are mounted, although this is not essential for the present invention.

Let us now assume that the rotor 10 needs to be repaired to replace the last three discs (however, the method of the invention can be used to replace any number of last discs of the rotor), i.e. the discs indicated in order at $14_{N-2}$, $14_{N-1}$ and $14_N$. It will now be described, with reference to FIGS. 2 and 3, how such discs are replaced using the method of the present invention.

Figure 2:
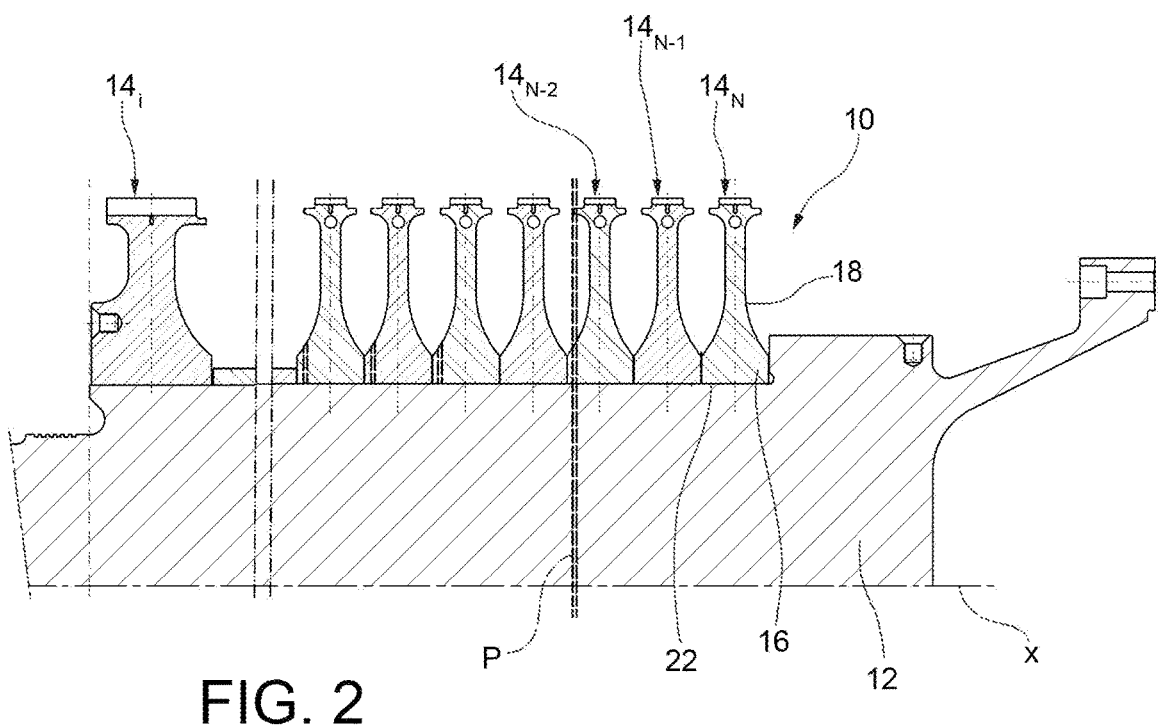
FIG. 2 is an axial section view, on an enlarged scale, of the end portion (in particular of the last seven stages) of the rotor of FIG. 1.

First of all, as shown in FIG. 2, the shaft 12 is cut at a section plane P perpendicular to the axis of rotation x in order to separate the end portion of the shaft on which the discs $14_{N-2}$, $14_{N-1}$ and $14_N$ to be replaced are mounted (in FIG. 2 only the hub 16 and the crown ring 18 of said discs are shown). The remaining portion of the rotor (hereinafter referred to as the recovered rotor portion), i.e. the remaining portion of the shaft (hereinafter referred to as the recovered shaft portion) with the discs $14_1$ to $14_{N-3}$ mounted thereon, is reused to provide the new rotor. The portion of the rotor that has been removed as a result of cutting the shaft at the section plane P is rebuilt and assembled to the recovered rotor portion as follows.

Figure 3:
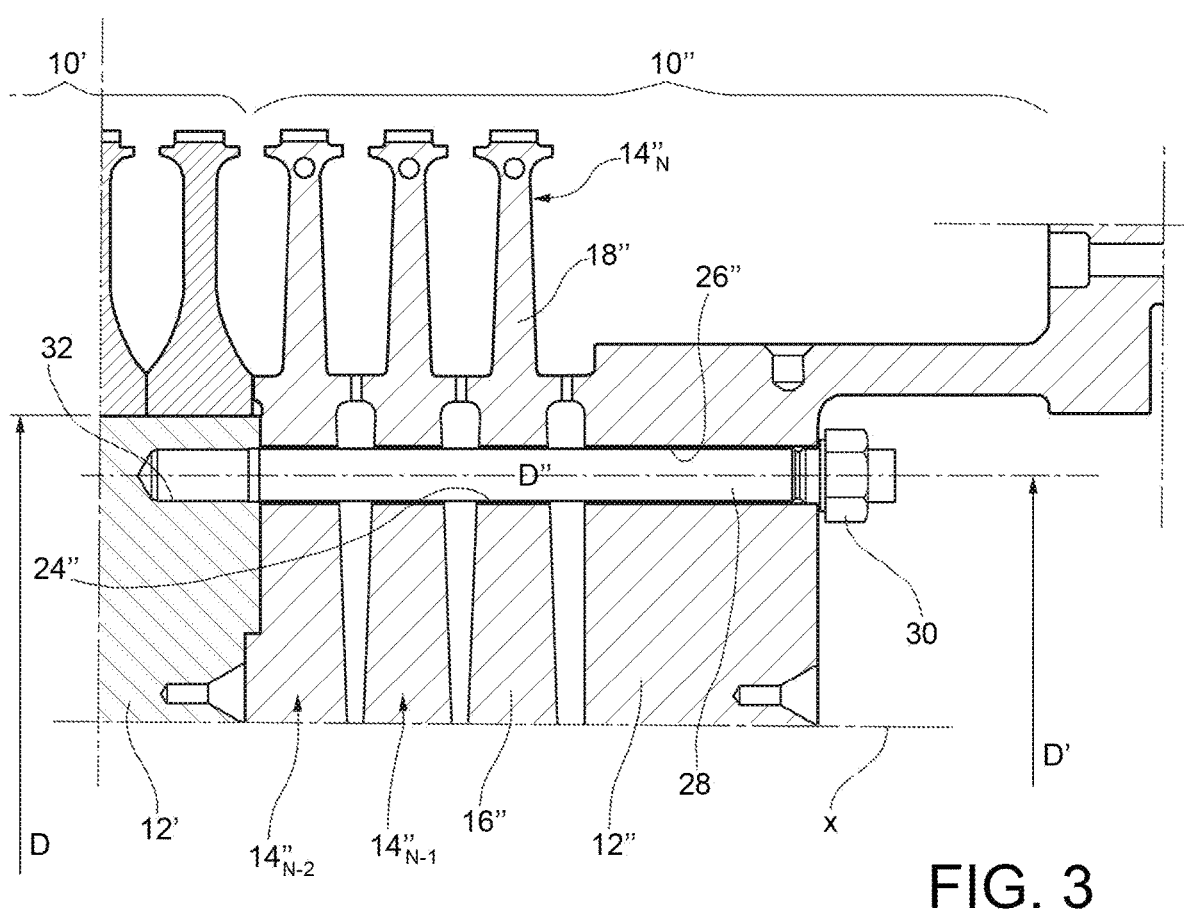
FIG. 3 is an axial section view of the end portion of the rotor of FIG. 1, after the last three bladed discs have been replaced using the method of the present invention.

FIG. 3 shows the rotor obtained at the end of the repair method of the invention. The rotor comprises the recovered rotor portion, indicated at 10', as well as a new portion of the rotor, indicated at 10". The recovered rotor portion 10' comprises, as mentioned above, the recovered shaft portion, indicated at 12', as well as the discs $14_1$ to $14_{N-3}$ fitted on the recovered shaft portion 12'.

The new rotor portion 10" comprises new discs $14_{N-2}"$, $14_{N-1}"$ and $14_N"$ (in this case three new discs, but in general a number of new discs equal to the number of old discs that have been removed by cutting of the shaft 12 at the section plane P) and a new end shaft portion 12".

Each of the new discs $14_{N-2}"$, $14_{N-1}"$ and $14_N"$ comprises a hub 16" and a crown ring 18", as well as a plurality of blades (not shown here) attached to the crown ring 18". While the crown ring 18" of each of the new discs $14_{N-2}"$, $14_{N-1}"$ and $14_N"$ has a shape substantially identical to that of the corresponding old disc $14_{N-2}$, $14_{N-1}$ and $14_N$, the hub 16" of each of the new discs $14_{N-2}"$, $14_{N-1}"$ and $14_N"$ has now a solid cross-section, i.e. without a central bore with a diameter corresponding to the diameter D of the shaft 12. Instead of a central bore with a diameter corresponding to the diameter D of the shaft 12, in the hub 16" of each of the new discs $14_{N-2}"$, $14_{N-1}"$ and $14_N"$ a plurality of through holes 24" (only one of which is shown in FIG. 3) are provided, which have a diameter D" smaller than the diameter D of the shaft 12, extend parallel to the axis of rotation x and are preferably positioned along a circumference with center on the axis of rotation x and diameter D' smaller than the diameter D of the shaft 12, but larger than the diameter D" of the holes 24".

The new end shaft portion 12" also has a solid cross-section with through holes 26" (only one of which is shown in FIG. 3), each of which is aligned with a respective through hole 24" of the new discs $14_{N-2}"$, $14_{N-1}"$ and $14_N"$.

The new discs $14_{N-2}"$, $14_{N-1}"$ and $14_N"$ are arranged side by side, clamped between the recovered shaft portion 12' and the new end shaft portion 12" by means of anchor bolts (only one of which is shown in FIG. 3), each of which comprises a screw 28 and a nut 30. Each screw 28 is inserted through a respective through hole 26" of the new end shaft portion 12", as well as through a respective through hole 24" of each one of the new discs $14_{N-2}"$, $14_{N-1}"$ and $14_N"$, and is screwed into a respective blind threaded hole 32 in the recovered shaft portion 12', the blind threaded holes 32 being made in the end face (indicated at 12a') of the recovered shaft portion 12' obtained by cutting of the shaft 12 at the section plane P. Each nut 30 is screwed onto the end of the respective screw 28 axially protruding from the new end shaft portion 12" on the side opposite to the recovered shaft portion 12'.

As mentioned above, since the new discs $14_{N-2}"$, $14_{N-1}"$ and $14_N"$ are not mounted by interference fit, unlike the old discs $14_{N-2}$, $14_{N-1}$ and $14_N$, and therefore do not need to be made of a material (e.g. stainless steel) with high creep resistance. They may be made of a material (in particular, of a less expensive material, such as micro-alloyed steel) other than that of the old discs $14_{N-2}$, $14_{N-1}$ and $14_N$.

Moreover, if after a certain time there is the need to replace the discs $14_{N-2}"$, $14_{N-1}"$ and $14_N"$ with corresponding new discs in order to further increase the service life of the rotor 10, this operation may be done even more easily, as it will be sufficient to disassemble the discs $14_{N-2}"$, $14_{N-1}"$ and $14_N$, after removing the anchor bolts, and mount new discs identical to the previous ones, recovering all the other components of the rotor.

As will be evident from the description provided above, the method of the present invention allows considerable savings, both in terms of cost and in terms of time, with respect to the known methods.

Naturally, the principle of the invention remaining unchanged, the modes for carrying out the method of the invention may vary widely from those described and illustrated herein purely by way of non-limiting example, without thereby departing from the scope of the invention as defined in the accompanying claims.

What is claimed is:

1. A method for repairing a rotor of a multi-stage axial compressor of a gas turbine by replacing a given number of old bladed discs with new bladed discs, wherein each of said old bladed discs comprises a hub having a central bore and wherein each of said old bladed discs is mounted by interference fit on a shaft of the rotor which is rotatable about an axis of rotation, the method comprising the steps of:

a) cutting the shaft at a section plane perpendicular to the axis of rotation of the shaft so as to separate an end portion of the shaft on which the old bladed discs to be replaced are mounted from a remaining portion of the shaft;

b) providing, for each old bladed disc to be replaced, a new bladed disc having a hub with a solid cross-section;

c) providing a new end portion of the shaft with a solid cross-section; and d) clamping the new bladed discs between said remaining portion of the shaft and the new end portion of the shaft, and securing the new bladed discs to the remaining portion of the shaft by anchor bolts.

2. The method of claim 1, wherein the new bladed discs are made of a material other than the material of the old bladed discs.

3. The method of claim 1, wherein the hub of each of the new bladed discs comprises a plurality of through holes, and wherein each of the anchor bolts comprises a screw that is caused to pass, for each new bladed disc, through a respective through hole of the hub of the new bladed disc.

4. The method of claim 3, wherein at step d) each of the screws of the anchor bolts is fixed to said remaining portion of the shaft by screwing into a respective blind threaded hole provided in an end face of the remaining portion of the shaft.

* * * * *